US006311846B1

(12) United States Patent
Hayduchok et al.

(10) Patent No.: US 6,311,846 B1
(45) Date of Patent: *Nov. 6, 2001

(54) METHOD AND APPARATUS FOR SORTING AND ACQUIRING IMAGE DATA FOR DOCUMENTS

(75) Inventors: George L. Hayduchok, Mount Holly; Robert R. Dewitt, Marlton; Albert F. Stevens, Moorestown, all of NJ (US)

(73) Assignee: Opex Corporation, Moorestown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/655,008

(22) Filed: Sep. 5, 2000

Related U.S. Application Data

(63) Continuation of application No. 09/160,401, filed on Sep. 25, 1998, now Pat. No. 6,112,902, which is a continuation-in-part of application No. 08/687,704, filed on Jul. 26, 1996, now Pat. No. 5,842,577, and a continuation-in-part of application No. 08/666,737, filed on May 17, 1996, now Pat. No. 5,926,392.

(51) Int. Cl.[7] ........................................ B07C 5/02
(52) U.S. Cl. ................... 209/3.3; 209/538; 209/541; 209/545; 209/583; 209/587
(58) Field of Search ....................... 209/3.2, 3.3, 538, 209/540, 541, 545, 583, 584, 587, 939

(56) References Cited

U.S. PATENT DOCUMENTS

| | | |
|---|---|---|
| 3,266,626 | 8/1966 | Simjian . |
| 3,728,020 | 4/1973 | Abrams . |
| 4,863,037 | 9/1989 | Stevens . |
| 4,921,388 | 5/1990 | Nelson . |
| 4,968,419 | 11/1990 | Karalus . |
| 5,054,620 | 10/1991 | DeWitt . |
| 5,054,700 | 10/1991 | DeWitt . |
| 5,115,918 | 5/1992 | DeWitt . |
| 5,240,116 | 8/1993 | Stevens . |
| 5,293,431 | 3/1994 | Hayduchok . |
| 5,310,062 * | 5/1994 | Stevens et al. ............... 209/584 |
| 5,460,273 | 10/1995 | Stevens . |
| 5,540,338 | 7/1996 | Stevens . |
| 5,558,232 | 9/1996 | Stevens . |
| 5,842,577 | 12/1998 | Stevens . |
| 5,926,392 | 7/1999 | York . |
| 6,112,902 * | 9/2000 | Hayduchok et al. ............ 209/3.3 |

* cited by examiner

*Primary Examiner*—David H. Bollinger
(74) *Attorney, Agent, or Firm*—Dann, Dorfman, Herrell and Skillman; Stephen H. Eland

(57) ABSTRACT

An apparatus is provided for sorting a group of documents contained with an envelope into selected batches of documents. An envelope feeder feeds a group of envelopes containing documents onto a document transport. A document extractor positioned along the path of movement extracts the documents from the envelopes. A system controller identifies the documents extracted from each respective envelope along with the respective envelope as a single transaction along the path of movement. An orientation detector including a magnetic image reader and an optical image reader determines the orientation of selected documents along the path of movement. A document orientor changes the orientation of documents along the path of movement into a desired orientation. An image acquisition device acquires an image of the envelopes and selected documents conveyed along the path of movement to enable the system controller to assign documents and the envelope from which it was extracted into selected transactions and batches. A non-volatile image storage medium stores the acquired images of the envelopes. A document sorter sorts the documents and envelopes of respective batches into selected output areas.

33 Claims, 10 Drawing Sheets

METHOD AND APPARATUS FOR SORTING AND ACQUIRING IMAGE DATA FOR DOCUMENTS

RELATED APPLICATIONS

This is a continuation of application U.S. application Ser. No. 09/160,401 filed on Sep. 25, 1998 now U.S. Pat. No. 6,112,902, which is a continuation-in-part of U.S. application Ser. No. 08/687,704 filed on Jul. 26, 1996, now issued as U.S. Pat. No. 5,842,577 and U.S. application Ser. No. 08/666,737 filed on May 17, 1996, now issued as U.S. Pat. No. 5,926,392, each of which applications are hereby incorporated herein by reference.

FIELD OF THE INVENTION

The present invention relates to a system and method for processing mail and, more specifically, to an apparatus and method for extracting, reordering, reorienting, and sorting documents, and correlating the documents with information from the envelopes from which the documents were extracted.

BACKGROUND OF THE INVENTION

Automated and semi-automated machines have been employed for processing documents in bulk quantities. Due to the volume and scale of commercial transactions routinely processed by many companies, there has long been a need for automated processing of mail. In this regard, automated document processing has become particularly important in the area of remittance correspondence.

Utility companies, phone companies, and credit card companies routinely receive thousands of payment envelopes from their customers on a daily basis. Typically, a customer payment envelope contains an invoice stub and some type of customer payment, usually in the form of a bank check or money order. The contents of each envelope are generally referred to as a transaction, and may consist of one or more documents including one or more invoices and one or more checks. The most common transaction consists of a single invoice stub and an accompanying check. Such transactions are typically referred to as singles transactions.

According to conventional methods of automated or semi-automated remittance processing, documents located within an envelope, such as an invoice and an accompanying check, are processed by being extracted from the envelope, placed in the proper sequence and orientation, and then stacked into groups or batches of documents. The extracting, sequencing and orienting of the invoices and checks has been effected both manually and by the use of automated or semi-automated equipment. The envelope used to carry the documents into the system for sorting is typically directed by the system for disposal upon extraction of its contents.

In certain applications, it is desirable to obtain information from the envelope before discarding the envelope. For instance, insurance renewals are time-sensitive. If a renewal payment is received after a renewal date, then the policy may lapse. In such instances it is desirable to read the post-mark on the face of the envelope to determine when the payment was mailed.

In accordance with the present invention, an apparatus and method are provided for extracting documents from envelopes, reordering and reorienting the documents, and acquiring and storing data regarding the envelopes so that the association among the documents in the transactions relative to the envelope indicia is known and available for further verification and/or administrative use.

SUMMARY OF THE INVENTION

The present invention provides an apparatus for sorting a group of documents contained within envelopes into selected batches of documents. The apparatus includes a transport for conveying documents and envelopes containing documents along a selected path of movement. An envelope feeder feeds envelopes containing documents onto the transport. An extractor positioned along the path of movement extracts the documents from the envelopes. An orientation detector determines the orientation of the documents along the path of movement. The document orientor selectively changes the orientation of the documents along the path of movement into a desired orientation. An image acquisition device along the path of movement acquires images of the envelopes. A system controller receives the envelope images and correlates the image of a particular envelope with the documents extracted from the envelope.

The present invention also provides a method for processing documents contained within envelopes. According to the method, an envelope containing a document is conveyed along a selected path of movement, wherein the envelope has indicia on at least one face. The document is extracted from the envelope and the envelope indicia is correlated with the document extracted from the envelope.

DETAILED DESCRIPTION OF THE DRAWINGS

The foregoing summary as well as the following detailed description of the preferred embodiments of the present invention will be better understood when read in conjunction with the appended drawings, in which.

DETAILED DESCRIPTION OF THE PREFERRED EMBODIMENTS

Figure 1:
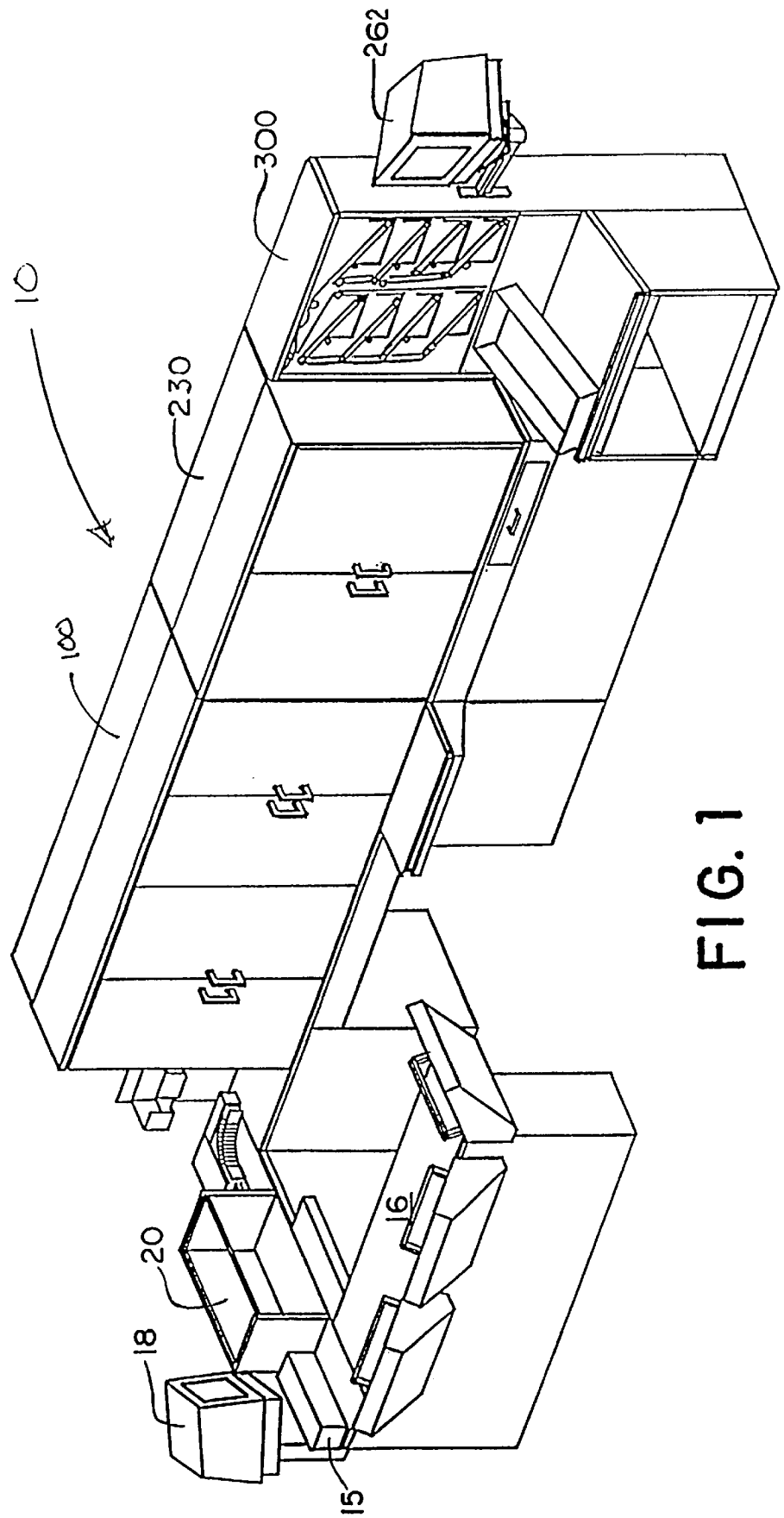
FIG. 1 is a schematic perspective view of an automated document processing apparatus in accordance with the present invention.

Referring to the drawings in general and more specifically to FIG. 1, an apparatus for automatic processing of documents contained within envelopes is illustrated. The apparatus 10 processes documents by acquiring image data for selected envelopes and exporting the image data to a remote device. The apparatus extracts the documents from their envelopes, selectively reorders and reorients the documents, and sorts the documents into bins.

Figure 2:
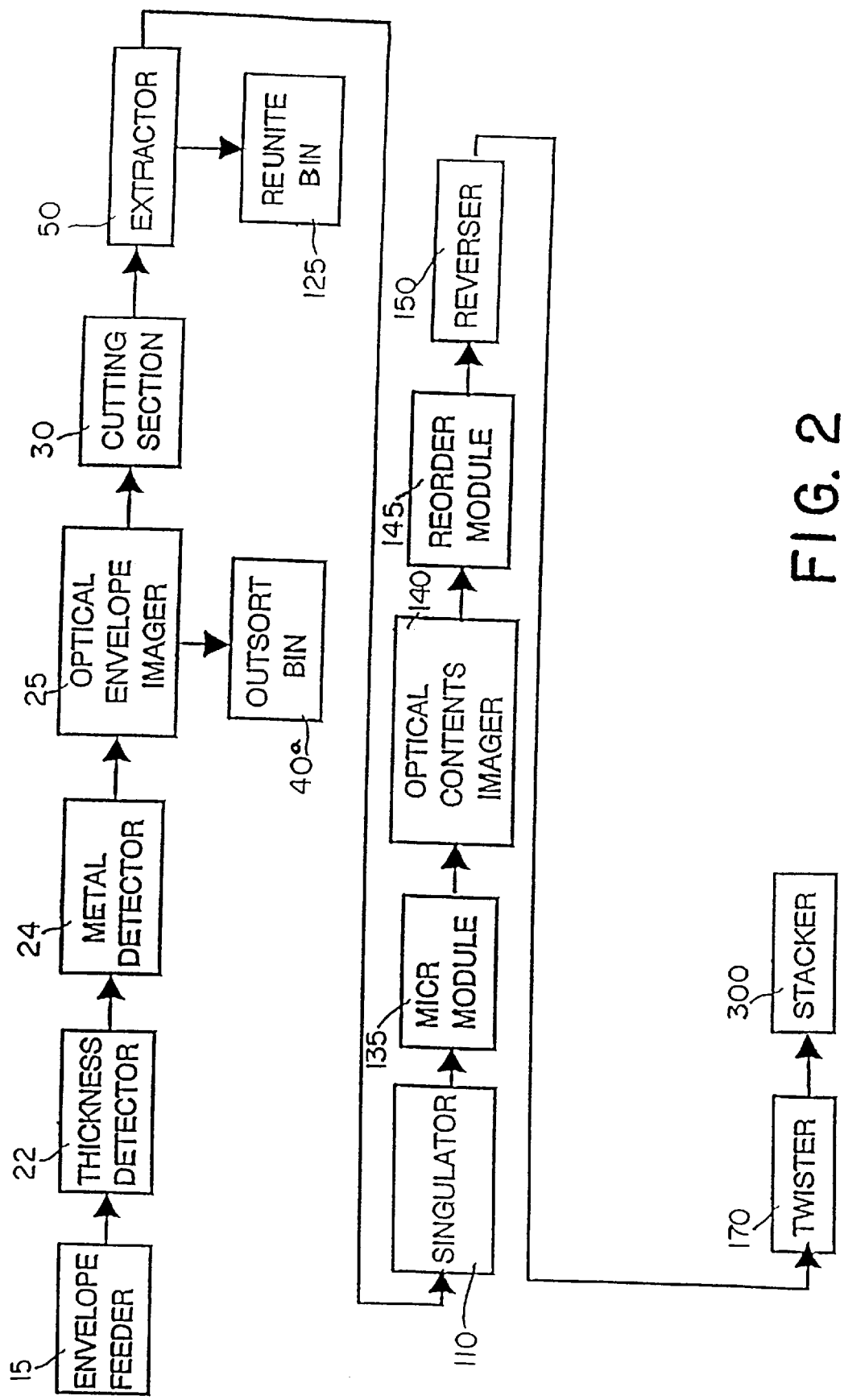
FIG. 2 is a block diagram showing the flow of documents through the automated document processing apparatus shown in FIG. 1.

Referring to FIGS. 1 and 2, a general overview of the flow of documents through the apparatus is provided. Initially, a stack of documents within envelopes is placed into an input bin 16 of an envelope feeder 15. The envelope feeder 15 serially feeds the envelopes into a system transport 75 that conveys the envelopes to an envelope qualifying station 20 that includes a thickness detector 22, a metal detector 24 and an optical envelope imager 25. The envelope qualifying station 20 examines each envelope to determine whether the envelope qualifies for extraction.

The envelope imager 25 acquires and processes image data for the envelopes. For instance, an envelope may contain an identifying mark such as an identification number. One such example is an identification number that an ATM machine prints onto each deposit envelope at the time of deposit. The envelope imager may be configured to process the envelope image data to detect the presence of the identification number printed on the envelope, and to read the identification number if detected. The image data for the envelope along with information regarding the envelope such as the identification number is then exported to a remote device so that the image data can be subsequently retrieved if desired.

Figure 4:
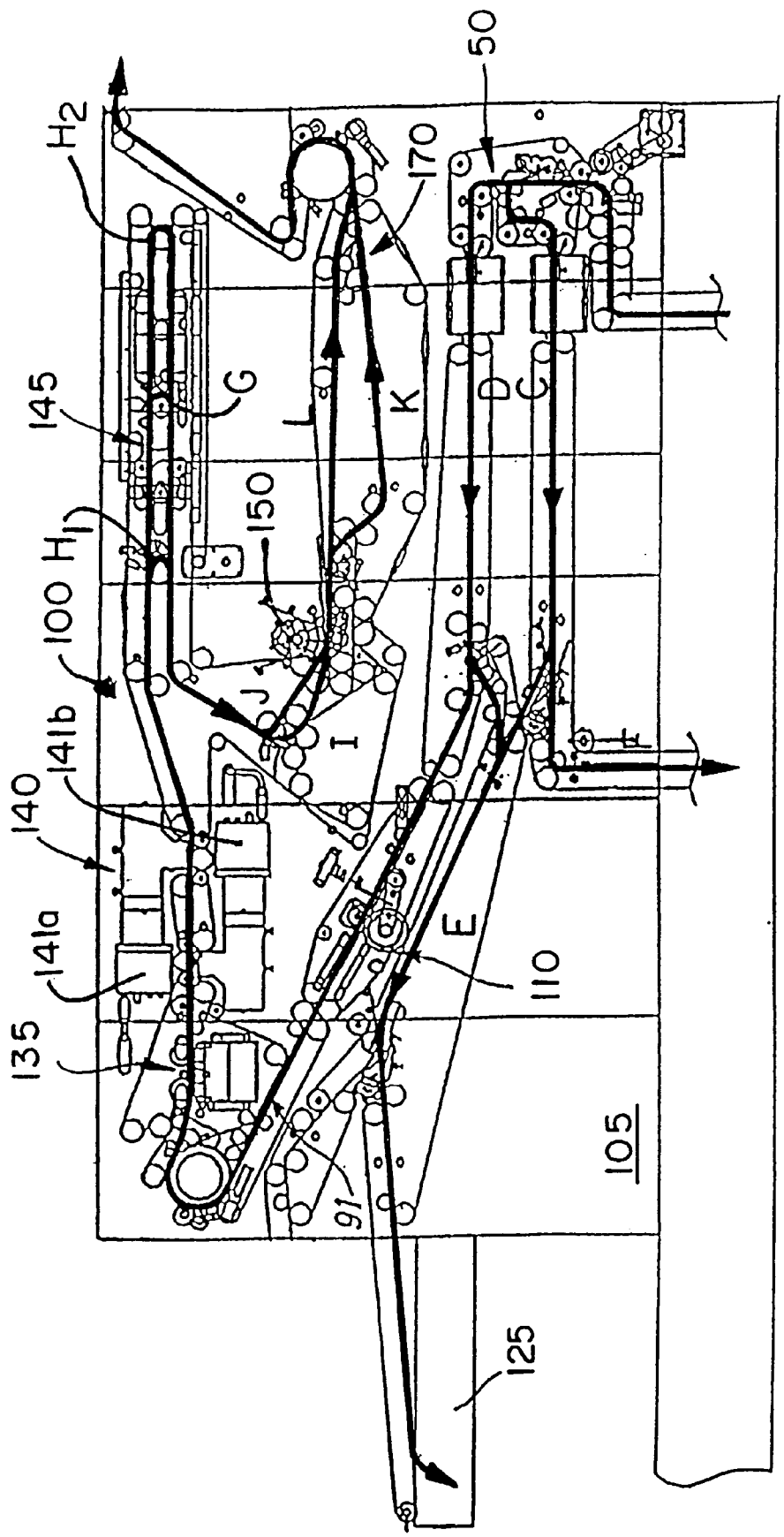
FIG. 4 is a fragmentary side elevational view of the automated document processing apparatus shown in FIG. 1, illustrating the flow of document through an extractor and a orientation section.

Envelopes that are qualified for extraction are opened in a cutting area 30 and then conveyed to an extractor 50 to extract the transactional contents from the envelopes. A singulator 110 separates the documents within the transactions and serially feeds the documents into the orientation section 100 illustrated in FIG. 4. In the orientation section 100, the order and orientation of each document are determined. The documents are then selectively manipulated by a reordering module 145, a reverser 150 and a twister 170 so that the documents in each transaction are in a predetermined order and orientation.

From the orientation section 100, the documents may be conveyed to an optional document imaging module 230. The details of such a document imaging module are disclosed in copending U.S. patent application Ser. No. 08/687,704.

The document imaging module acquires and processes image data for the documents. For instance, the document imaging module may be configured to process the image data for a document to detect the presence of an OCR line and to read the OCR line if detected. The document image data is combined with the envelope image data for the corresponding envelope to create a data record for each transaction. Preferably, the data record for each transaction includes the image data for the envelope, data relating to the envelope, the image data for the documents contained within the envelope, data relating to the documents, such as the OCR line, and miscellaneous information, such as batch information. The data records are then exported to a remote device such as a fileserver.

After the documents are properly ordered and oriented, the documents are conveyed to a stacker 300, illustrated in FIG. 1, which sorts the documents into a series of bins. The stacker 300 sorts the documents into groups referred to as batches. Each batch is assigned a control number, referred to as a batch number. For each batch, the stacker 300 sorts the invoices into one bin, and the checks into a separate bin. Alternatively, it may be desirable to stack the checks and invoices for a batch together into one bin so that the documents for each particular transaction are together in the same stack.

Figure 7:
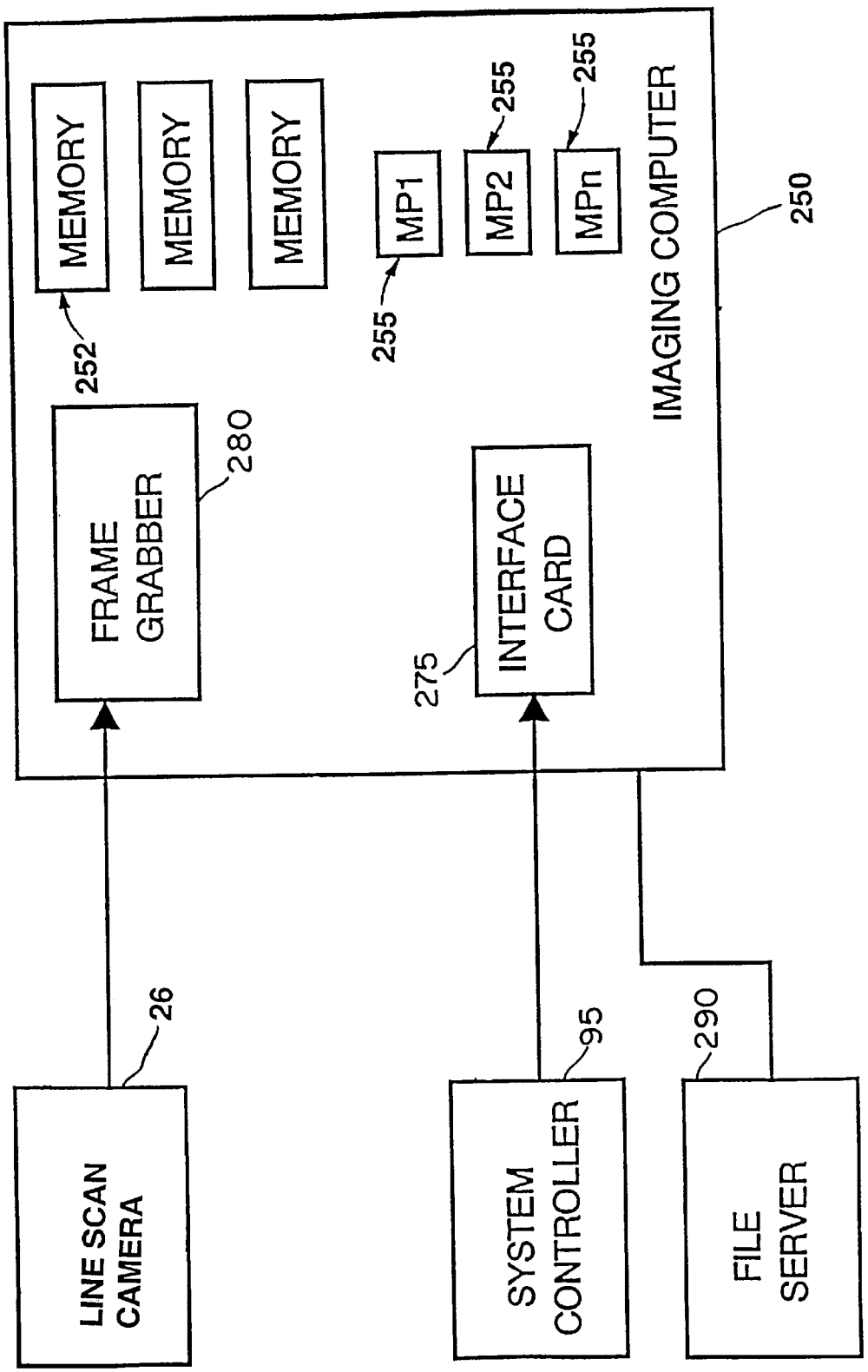
FIG. 7 is a schematic block diagram illustrating the interconnection between the imaging computer and other components of the automated document processing apparatus shown in FIG. 1.

A system controller designated 95 in FIG. 7 monitors the flow of documents in response to signals received from the various components of the apparatus 10. In particular, the system controller 95 monitors the boundaries of each transaction as the documents are processed. Because each envelope defines the boundaries for each transaction, and the documents are initially contained within envelopes, the boundaries for each transaction are known. Once documents are extracted from an envelope, the system controller monitors the documents from each transaction to ensure that documents from one transaction do not become associated with the documents from a different transaction. For example, the system controller ensures that a check from envelope A does not become associated with an invoice from envelope B. This is referred to as maintaining transactional integrity. The system controller 95 ensures that transactional integrity is maintained through the entire process.

Two personal computers allow an operator to interface with the system controller 95. An operations computer is the primary interface with the system controller for controlling the operation of the apparatus. The operations computer includes a monitor 18 to display information regarding the processing of documents. A keyboard is also provided to allow the operator to input various information necessary to process a group of documents, such as the type of transactions to be processed. In addition, an envelope imaging computer 250 allows the operator to interface with the system controller 95 regarding operation of the envelope imager 25. Further, if the optional document imager 230 is included, the device includes a third computer 260 that allows the operator to interface with the system controller regarding operation of the document imager. As shown in FIG. 1, if the document imager is included, a display 262 for the document imaging computer 260 is mounted on an articulating arm on the side of the stacker 300.

Qualifying Envelopes for Extraction

Figure 3:
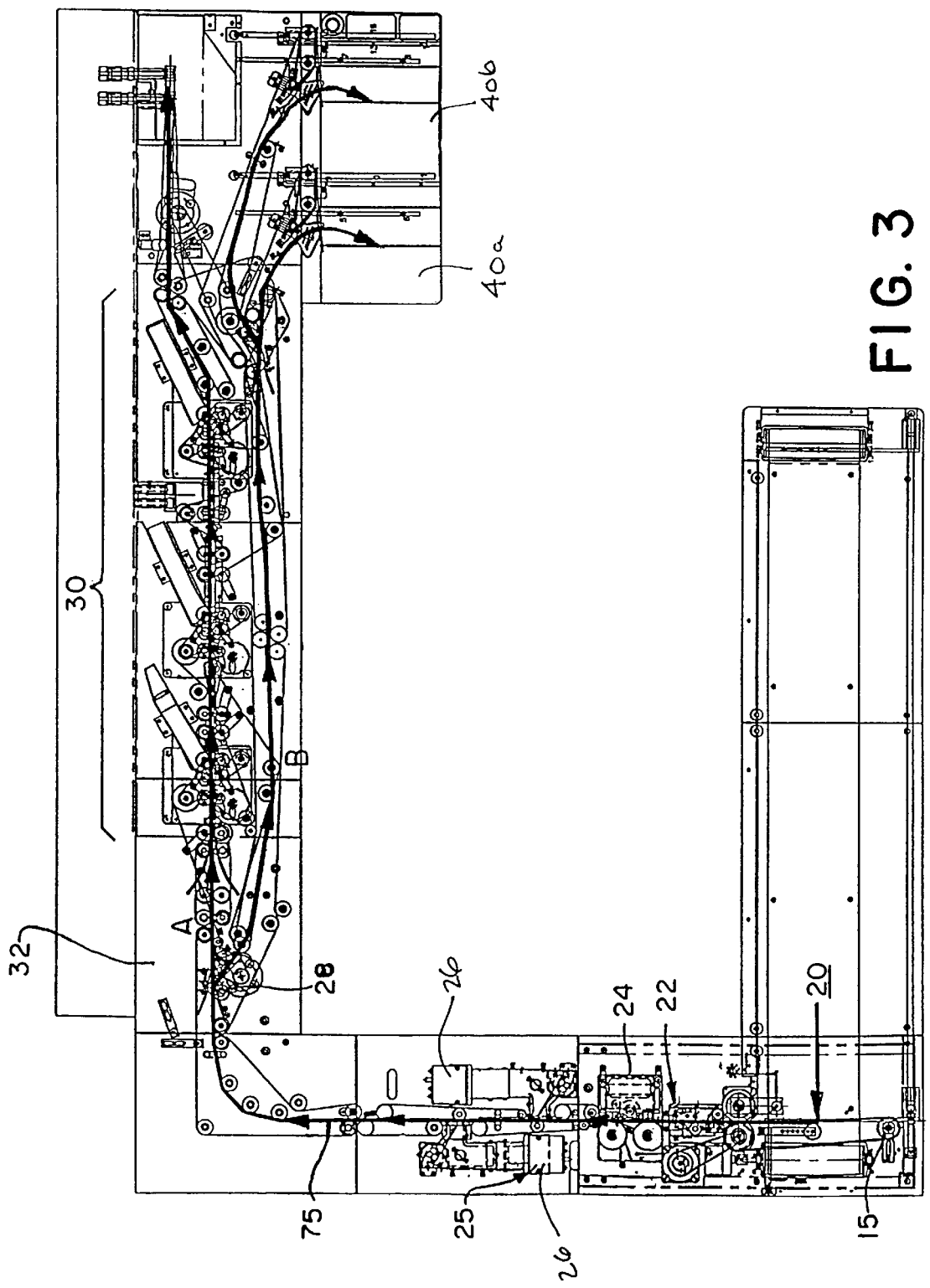
FIG. 3 is a fragmentary plan view of the automated document processing apparatus shown in FIG. 1, illustrating the flow of documents through an envelope feeder and a cutting section.

Referring now to FIGS. 1 and 3, a stack of envelopes is placed into the input bin 16 of the envelope feeder 15 which serially feeds the envelopes into the system transport 75. The system transport conveys the envelopes to an envelope qualifying station 20 that includes a series of detectors for examining each envelope to determine if the envelope meets certain criteria for being extracted. If an envelope meets the criteria for extraction, the envelope is directed to the cutting area 30 and the extractor 50 (shown in FIG. 4). Otherwise the envelope is directed to an outsort bin 40a.

The first extraction qualifying detector is a thickness detector 22. If the thickness of an envelope does not fall within a predetermined range, the envelope is electronically tagged by the system controller 95 and outsorted prior to extraction. For example, one mode of operation for the apparatus 10 is processing singles, which are transactions that consist of only one check and one invoice. In singles mode the allowable range is set to correspond to the thickness of an envelope and two documents. Envelopes that contain only one document, such as a check without an invoice, will have a thickness that is less than the allowable range. Such envelopes are not qualified for extraction. In the same way, envelopes that contain more than two documents will have a thickness that is greater than the allowable range, and therefore are not qualified for extraction. Envelopes that do not qualify for extraction are electronically tagged and outsorted prior to extraction so that the outsorted envelopes can be processed separately from the envelopes containing singles.

The thickness range can be varied to accommodate different jobs. For instance, the thickness range can be set so that only envelopes having a single document will be qualified for extraction. In addition, the thickness indicator 22 does not qualify envelopes containing paper clips or returned credit cards because the envelopes typically have a thickness that is greater than the allowable range. Therefore, envelopes containing returned credit cards or paper clips, which generally require special handling, are outsorted prior to extraction.

During qualification, the thickness detector can be used to detect empty envelopes. Empty envelopes have a thickness that is below a predefined threshold. Envelopes that have a thickness below the threshold are electronically tagged and outsorted to a separate outsort bin 40*b* prior to extraction. In this way, possibly fraudulent and erroneous deposits can be identified. For instance, a person can make a fraudulent ATM deposit by intentionally depositing an empty envelope that indicates that a cash or check deposit is included in the envelope. After the deposit is processed, the person who made the deposit can contend that the cash or check was actually included in the deposit and that one of the persons responsible for processing the deposit stole the cash or check. In the present instance such an empty envelope is outsorted to an alternate outsort bin 40*b* prior to being edge-severed or extracted. A record can then be made showing that the sealed envelope is empty, thereby providing evidence that the deposit was not actually made. For this reason envelopes that are considered to be empty are sorted to the alternate outsort bin 40*b* that is separate from the outsort bin 40*a* for receiving envelopes that are not qualified for some other reason, such as envelopes that are not qualified because the metal detector indicates the presence of a ferrous object, as is discussed further below.

The qualifying station may also include a MICR detection device for identifying fraudulent and erroneous deposits. The MICR detector is operable to detect a MICR line on a document while the document is enclosed within an envelope. The MICR detector is also operable to detect the presence of magnetizable ink that is used to print cash while the cash is enclosed within an envelope. If the MICR detector does not detect the presence of a MICR line or a signal indicative of cash, then the MICR detector determines that the envelope does not contain a deposit and the envelope is outsorted to the alternate outsort bin 40*b*.

The MICR detector may detect the presence of a fraudulent or erroneous deposit independently of the determination of the thickness detector. For instance, if a person fraudulently indicates that a deposit is made and inserts blank paper into the deposit envelope, the thickness detector may not indicate that the envelope should be outsorted. However, if the thickness detector indicates that the thickness of an envelope is within an acceptable range indicating that the envelope may contain a deposit, but the MICR detector does not detect the presence of a MICR line or a signal indicative of cash, the apparatus determines that the envelope does not contain a deposit. The envelope is then outsorted to the alternate outsort bin 40*b* for empty envelopes prior to edge-severing or extraction. Conversely, if the envelope thickness is below the predefined threshold and the MICR detector detects the presence of a MICR line, which indicates the presence of a check, then the envelope is outsorted to outsort bin 40*a* so that the envelope is sorted separately from the empty envelopes.

In addition, it may be desirable to separate deposits containing cash from deposits comprising checks only. Accordingly, the MICR detector may be used to detect the presence of cash within envelopes as described above. If the MICR detector scans an envelope and detects a signal indicative of cash, then the envelope may be electronically tagged and outsorted. The deposit may be outsorted prior to extraction to an area that is separate from both the empty envelopes and the envelopes that are not qualified for a different reason. Alternatively, the cash deposits may be extracted and then outsorted prior to further processing.

The envelopes are next qualified by a metal detector 24. The metal detector detects the presence of ferrous and non-ferrous metallic objects such as staples and paper clips. If the metal detector 24 detects the presence of a metallic object within an envelope, the envelope is not qualified for extraction and the system controller 95 electronically tags the envelopes so that the envelope is outsorted prior to extraction.

From the metal detector 24, the envelopes are conveyed to the envelope imager 25. Referring to FIGS. 3 and 7, the envelope imager 25 includes at least one line scan camera 26 that scans each envelope to obtain an image of a face of each envelope. The line scan camera 26 is controlled by an envelope imaging computer 250. Preferably, the envelope imaging computer 250 also processes the image data for each envelope to detect the presence of a particular characteristic, such as an envelope identification number. The envelope imaging computer exports data regarding the envelopes to the system controller 95. The system controller then determines whether the envelope is qualified for extraction based on the output from the thickness detector 22, the metal detector 24 and the envelope imager 25.

For instance, a customer response box may be located on the face of an envelope and the extraction qualification may be based on the presence of a mark in the response box. The envelope imager 25 scans the envelope face to obtain an image of the envelope face. The envelope imaging computer 250 receives the image data from the line scan camera 26 and processes the data to determine whether a customer has indicated a response by placing a mark in the response box. The envelope imaging computer then sends a signal to the system controller indicating whether a mark was present on the envelope. If a customer response is detected, the system controller may electronically tag the envelope as having a customer response and outsort the envelope prior to extraction. Alternatively, rather than outsorting the envelope, the envelope and its contents may be processed and the system controller 95 may electronically tag the contents indicating that a customer response was present on the envelope. The data regarding the response on the envelope along with the image of the envelope is then correlated with the documents that are later extracted from the envelope.

In addition to scanning for marks, the envelope image data can be used to determine the presence of particular information on an envelope, such as an identification number printed by an ATM, a change of address indication on the envelope or a POSTNET bar code. The envelope imager 25 can also be used to detect whether an envelope and its contents are damaged. Damaged envelopes are typically outsorted prior to extraction. Further, it may be desirable to obtain an image of both faces of the envelopes. Accordingly, the envelope imager 25 may include a second line scan camera, opposing the first camera 26.

Acquisition and Processing of Envelope Image Data

Referring now to FIG. 7, in response to signals received from the system controller 95, the envelope imaging computer 250 controls the operation of the envelope imager 25 via a frame grabber 280. When an envelope enters the envelope imager, an entry sensor detects the presence of the envelope. The entry sensor sends a signal to the system controller 95 indicating the presence of an envelope. The system controller then sends a signal to the envelope imaging computer indicating that the envelope detected by the entry sensor is to be scanned.

The envelope imaging computer 250 sends a signal to the frame grabber 280 indicating that an envelope is to be scanned. In turn, the frame grabber sends control signals to the imaging camera 26 and the camera scans the envelope to acquire image data. The frame grabber 280 receives the image data from the camera and then stores the data in memory residing on the frame grabber card. The imaging computer microprocessor 255 then transfers the image data from the memory of the frame grabber 280 into the imaging computer RAM memory 252. Alternatively, the image data can be transferred directly to the RAM of the image computer 250 without storing the data in the memory resident on the frame grabber card.

Once the image data is transferred to the RAM 252 of the imaging computer 250, the image data is processed by the envelope imager computer's microprocessor 255 which may include separate processors MP1, MP2, through MPn. The image data may be processed by binarizing the image to create a black and white image to detect the presence of certain characteristics, such as a customer response or an identification number. After the characteristics are determined, the image data is compressed. If the image is binarized, the image data for the envelope is compressed using Group 4 fax compression commonly referred to as "CCITT Group 4." Alternatively, the binarized image may be discarded and the grey scale image acquired by the imaging module can be compressed using JPEG compression. The image data may then be exported to a remote device and stored for later retrieval, if desired. Alternatively, the compressed image may be combined with data to form a data record for the envelope. A data record may include information from the envelope, such as a change of address indication, the presence of a POSTNET barcode, an ATM identification number, and/or the presence of a mark indicating a customer response.

The envelopes and accompanying documents are sorted and maintained in groups referred to as batches, which are identified by a unique batch number. The image data for a batch of mail is organized and maintained in batch data record files. The batch files may be organized so that the organization of the images in a particular batch file directly corresponds to the organization of the envelopes in the batch.

A complete batch file includes a batch header and the data records for each of the envelopes and associated contents in the corresponding batch. The batch header includes information that is common to all of the envelopes and associated contents in the batch, such as the batch number, the date the envelopes and associated contents were processed, and the number of envelopes and associated contents in the batch. Once all of the records have been appended to a batch file, the batch file is exported from the imaging computer 250 to an image file server 290, in the form of a personal computer, PC, via an ethernet connection.

Extraction of Contents from Envelopes

Referring again to FIG. 3, from the optical envelope imager 25, the system transport 75 conveys the documents to a gate 28 that is operable between two positions. Envelopes that were not qualified for extraction because they do not meet certain criteria are directed down an outsort path designated B in FIG. 3 to one of the outsort bins 40*a*, 40*b*. For example, if the thickness detector 22 detects an envelope that has a thickness that is not within a pre-determined range, the system controller does not qualify the envelope for extraction, and the envelope is directed to outsort path B.

Envelopes that are qualified for extraction are directed down the path designated A to the cutting area 30. In the cutting area 30, the leading edge, top edge and bottom edge of each envelope are cut so that the faces of each envelope are only joined along the trailing edge. From the cutting area, each envelope and its accompanying transaction are conveyed to an extractor 50. In the present instance, to minimize the floor space of the apparatus, the extractor 50 and the orientation section 100 are mounted on a vertical base plate 105, perpendicular to the horizontal base plate 32 of the cutting area 30.

Figure 5:
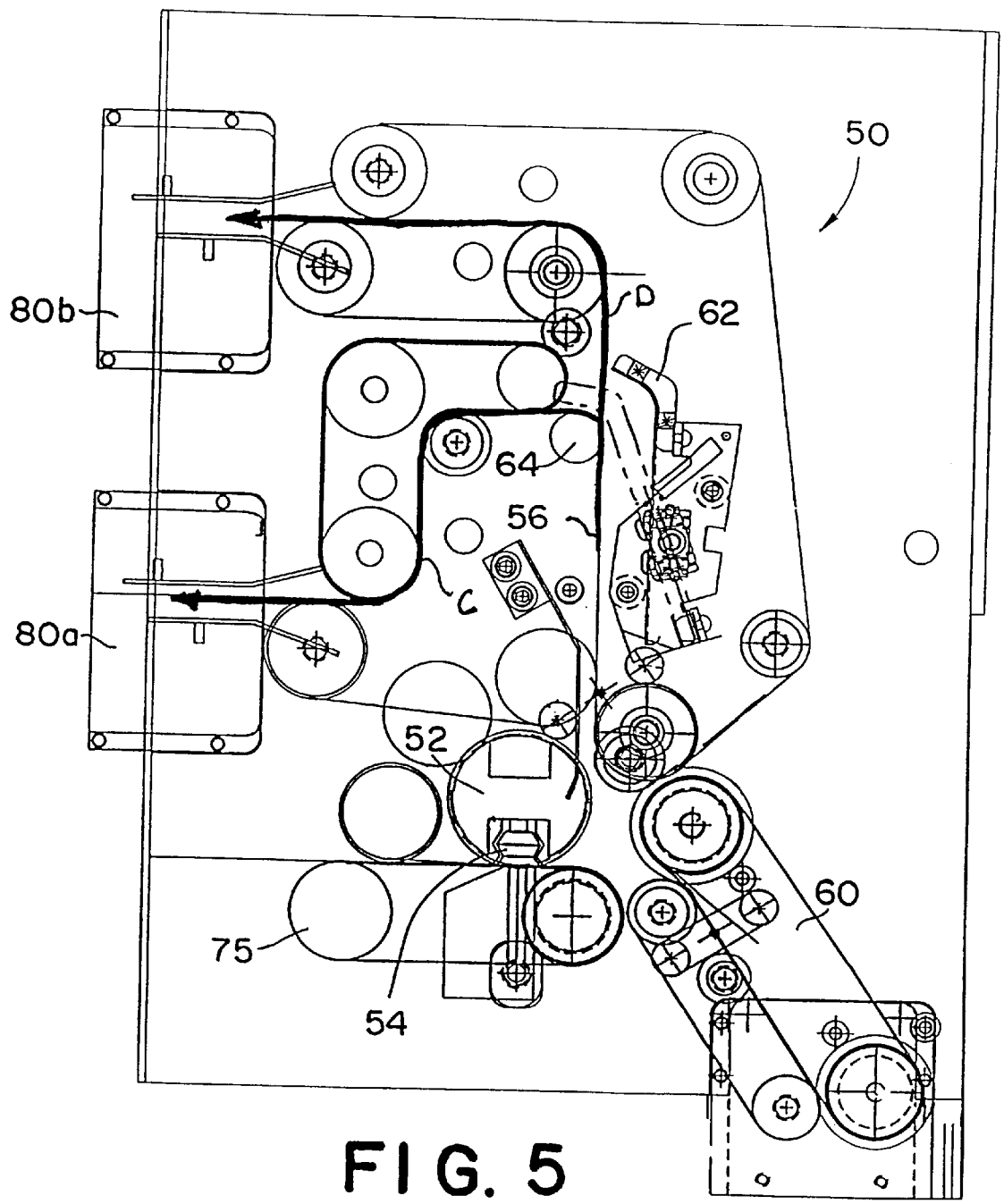
FIG. 5 is an enlarged fragmentary front elevational view of the extractor of the automated document processing apparatus shown in FIG. 1.

Referring now to FIG. 5 the details of the extractor 50 are more clearly illustrated. The extractor 50 separates an envelope from its contents by peeling off one envelope face and then directing the envelope down one path, and the contents down another path. The operation of the extractor 50 is more clearly understood with reference to FIGS. 5A–5E, which illustrate the progress of an envelope and its contents through the extractor.

Figure 5A:
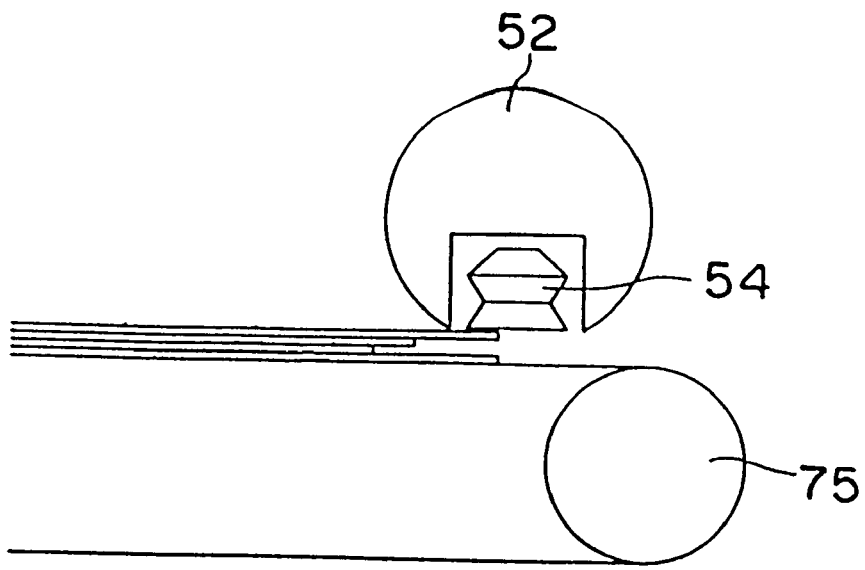
FIG. 5A is an enlarged fragmentary front elevational view of a portion of the extractor shown in FIG. 5, illustrating a piece of mail as it enters the extractor.
Figure 5B:
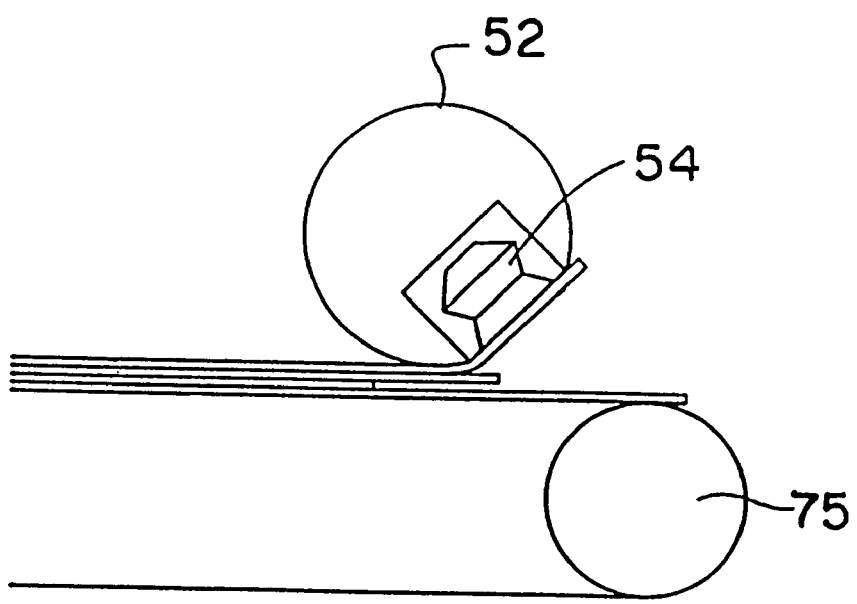
FIG. 5B is an enlarged fragmentary front elevational view of a portion of the extractor shown in FIG. 5, illustrating the initial extraction of documents from an envelope.
Figure 5C:
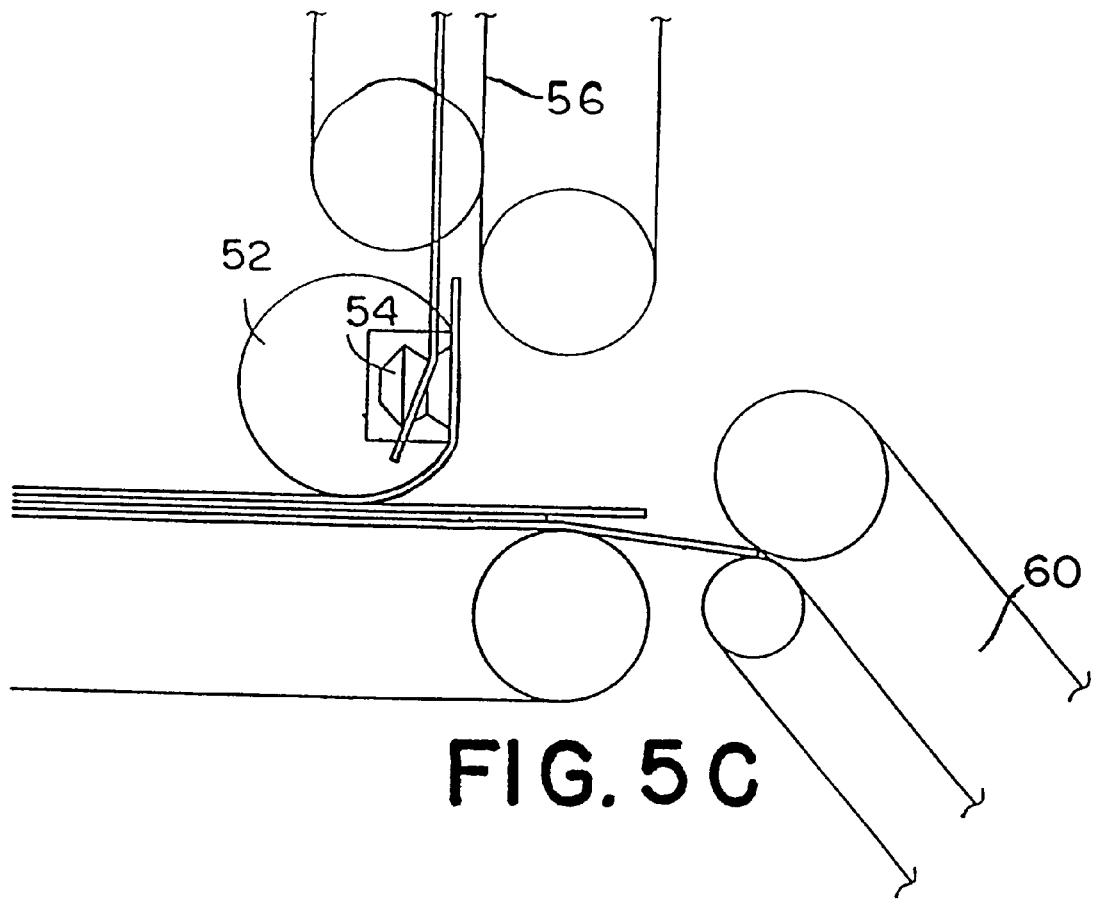
FIG. 5C is an enlarged fragmentary front elevational view of a portion of the extractor shown in FIG. 5, illustrating one face of the envelope entering an extraction transport and one section of the document entering a reversible transport.

In FIG. 5A, an envelope is shown as it first enters the extractor. The system transport 75 conveys the envelope and its contents past a rotatable extraction head 52. A suction cup 54 is mounted in a cavity in the extraction head 52. Referring to FIG. 5B, the suction cup 54 entrains one face of the envelope, referred to as the leading face. As the envelope passes horizontally through the extractor, the extraction head 52 rotates so that the leading face entrained by the suction cup is peeled away from the contents and diverted upwardly into an extraction transport 56, as shown in FIGS. 5B and 5C. At the same time, the contents of the envelope and the trailing face are directed downwardly into a reversible transport 60, which conveys the contents and the trailing face away from the leading face.

Figure 5D:
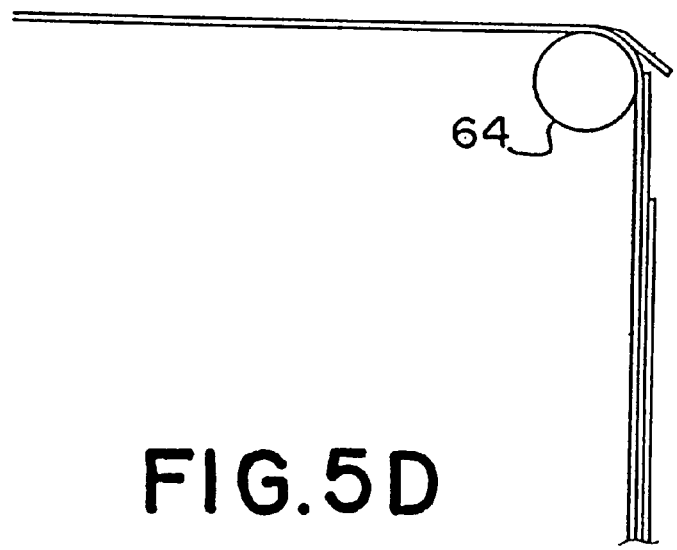
FIG. 5D is an enlarged fragmentary front elevational view of a portion of the extractor shown in FIG. 5, illustrating an envelope passing about a small diameter roller.
Figure 5E:
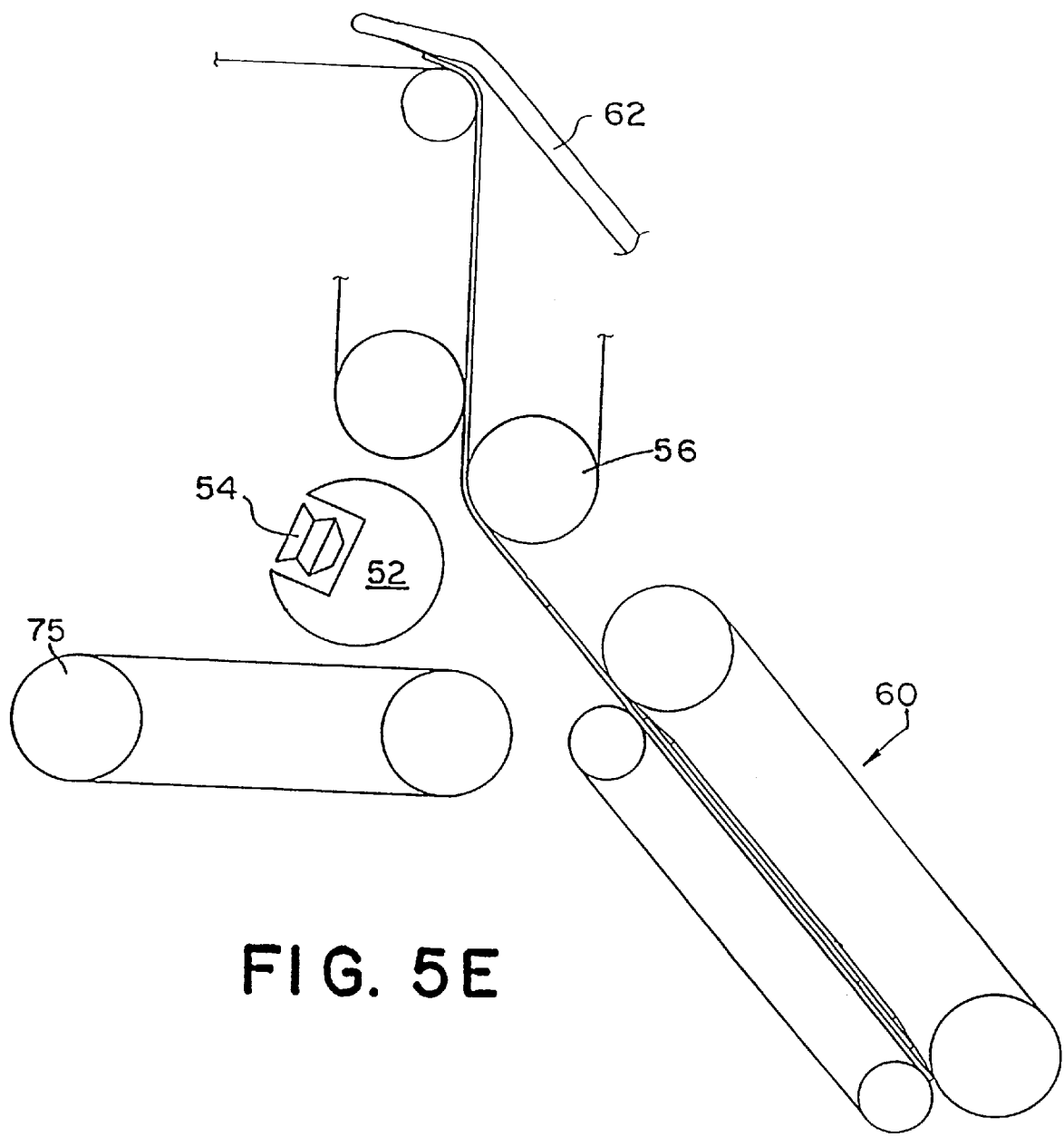
FIG. 5E is an enlarged fragmentary front elevational view of a portion of the extractor shown in FIG. 5, illustrating a deflector directing the leading face of an envelope down an envelope path.

As shown in FIG. 5E, the faces of the envelope are conveyed away from one another until the faces are stretched end to end to form a single taut length of paper joined in the middle by what was previously the trailing edge of the envelope. The reversible transport 60 then reverses directions and conveys the contents and the trailing face upwardly into the extractor transport 56.

A pivotable deflector 62 along the extraction transport 56 directs the leading face toward an envelope path, which is designated C in FIG. 5. After the leading envelope face enters the envelope path designated C, the deflector 62 pivots away from the extraction transport 56. The trailing face follows the leading face down envelope path C because the faces are connected. However, because the deflector 62 has been pivoted away from the extraction transport 56, the contents of the envelope follow the main path of the extraction transport to a document path designated D in FIG. 5. In this way, the envelope is separated from its contents.

Frequently, one of the documents in an envelope is entrained by one of the flaps that form the envelope, preventing separation of the envelope from the contents. To improve the separation between the envelope and its contents, the envelope passes around a small diameter roller 64 as the envelope enters envelope path C. As shown in FIG. 5D, by passing the envelope faces about a roller of relatively small diameter, the flaps associated with the envelope faces are peeled away from the envelope face, thereby releasing any potentially entrapped documents from between the flap and the envelope face.

A pair of thickness detectors 80a and 80b are disposed along the envelope path C and the document path D. The envelope thickness detector 80a senses the thickness of the envelope as the envelope leaves the extractor 50, and compares the thickness of the envelope with a predetermined limit. If the thickness of the envelope exceeds a predetermined limit, the system controller electronically tags the envelope so that the envelope and its contents are reunited and directed along the path designated E in FIG. 4 to a reunite bin 125. Similarly, if the document thickness indicator 80b indicates a thickness that exceeds a threshold level, it is assumed that the contents were not properly extracted from their respective envelope. The system controller 95 therefore electronically tags the content so that the contents are reunited with their respective envelope and directed along the path designated E to a reunite bin 125. If the thickness detectors 80a, 80b indicate that the contents have been properly extracted from their envelope, the envelope is directed along the path designated F to a waste container and the contents are directed to a singulator 110 that separates the documents within the transaction.

Figure 6:
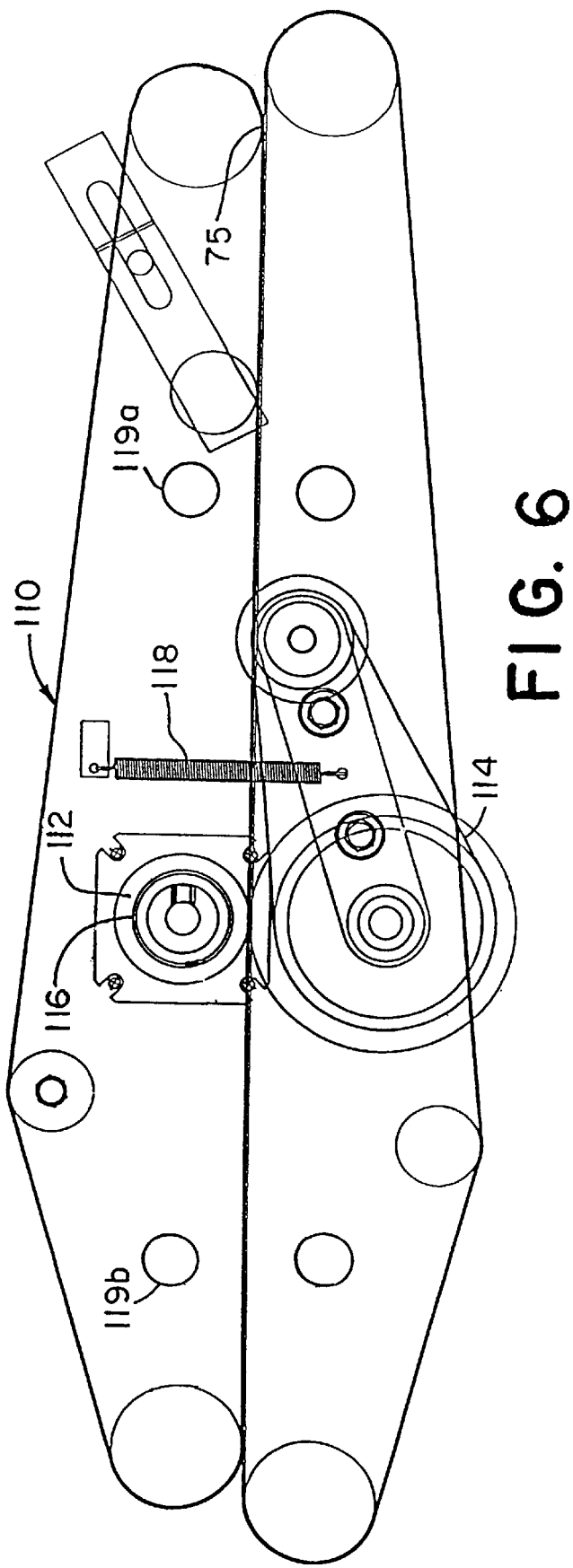
FIG. 6 is an enlarged front elevational view of the singulator of the automated document processing apparatus shown in FIG. 1.

Referring now to FIG. 6, the singulator 110 receives the transactional pairs of documents that were extracted by the extractor 50 and separates the documents so that the documents are serially delivered to the orientation section. The singulator includes an idler roller 112 and an opposing drive roller 114 mounted on a pivotable arm. A spring 118 connected to the arm biases the drive roller 114 toward the idler roller 112. The outer surface of the idler roller 112 has a coefficient of friction that is greater than the coefficient of friction of the outer surface of the drive roller 114. In addition, the coefficient of friction of the outer surface of the drive roller is greater than the coefficient of friction between the faces of the pair documents in a transaction. A brake 116 is also provided to stop the rotation of the idler pulley 112. An entry sensor 119a and an exit sensor 119b, tracks the documents as the documents pass through the singulator 110.

During operation, the system transport 75 conveys a transactional pair of documents in face-to-face arrangement to the singulator 110. The entry sensor 119a senses the leading edge of the pairs of documents as the pair enters the singulator 110, and then after a predefined delay, the brake 116 engages the idler roller 112 to retard or stop the rotation of the idler roller. The predefined delay allows the documents to enter the nip formed between the drive roller 114 and the idler roller 112 before the brake engages the idler roller 112. Because the outer surface of the idler roller has a coefficient of friction that is higher than the coefficient of friction of both the drive roller and the faces of the pair of documents, braking the idler roller causes the idler roller to engage and retard the progress of the document confronting the idler roller. At the same time, the document confronting the drive roller 114 is driven past the exit sensor 119b by the drive roller. In this way, the document that was initially confronting the drive roller becomes the leading document of the transactional pair.

Once the exit sensor 119b detects the passage of the leading edge of the leading document, the brake 116 disengages the idler roller 112, after a predetermined delay so that the drive roller 114 drives the trailing document past the exit sensor 119b. The release of the brake is controlled by the system controller in response to signals received from the exit sensor 119b, and is timed to control the gap between the leading and trailing documents in a transaction. To accentuate the gap between documents, the system transport operates at a higher speed upstream from the singulator.

Reorientation and Reordering of Documents

From the singulator 110, the apparatus 10 processes the documents by determining the order and orientation of the documents as the documents are conveyed through the system transport 75. When processing documents in transactions that were extracted from windowed envelopes, the order and orientation of the invoice is known because the customer placed the invoice in the front of the envelope with the preprinted return address visible through the window. Therefore, the sequence of the documents in a transactional pair and the orientation of the invoice in the transaction are both considered constant when processing windowed mail. However, the orientation of the check in a transaction is not constant, and therefore must be determined so that the check can be reoriented if necessary.

For this purpose, the system transport 75 serially conveys the documents to a MICR module 135 that functions as a magnetic imager to determine the orientation of the checks. The MICR module 135 first imparts a magnetic charge to the magnetic ink on the checks. The orientation of each check is then detected by reading the flux variation of the characters or markings on the check as the check is conveyed past the MICR module 135. The magnetic readings for the checks are interpreted by the MICR module 135 to determine the orientation of each check. The orientation decision by the MICR Module 135 is then transmitted to the system controller 95 which electronically tags the respective document with the orientation decision data.

The system controller also uses data from the MICR module to verify that the documents in a transaction are in the proper sequence. If the MICR module detects certain magnetic fluctuations in the document after the document has been magnetized, then the MICR module tags the document as a check. Otherwise, the document is tagged as an invoice or as being an indeterminable document. The information regarding the document identification is communicated to the system controller 95. The system controller 95 then electronically tags each document in sequential order as being a check or an invoice based on the data from the MICR module 135. The system controller 95 then uses the identification of each document to determine if the documents in a transaction are in the proper order. For example, a desired sequence for a transactional pair of a check and an invoice may be invoice first, then check, referred to as invoice/check. If the MICR module 135 detects magnetic markings on the first document, then the first document is presumed to be a check and the documents in the transaction are out of order, i.e. check/invoice order rather than invoice/check. The documents in the misordered transaction are electronically tagged by the system controller and directed to a reject bin.

If the system controller 95 verifies that the documents in a transaction are in order, but the check is not in the proper orientation, the apparatus reorients the check into the proper orientation. For this purpose, the documents are conveyed to a reverser 150. The reverser 150 functions to reorient the checks, if necessary, by flipping the checks from end to end along the path of movement so that the leading edge becomes the trailing edge and the trailing edge becomes the leading edge. As a result, a selected check may be flipped, if necessary, from front to back along the path of movement.

From the reverser 150, the documents are conveyed to a twister 170. If a check is not properly oriented in a right-side-up orientation, the check is reoriented by the twister. The twister 170 reorients a check by flipping the check about a horizontal axis so that the top edge of the check becomes the bottom edge and the bottom edge becomes the top edge. More specifically, the check is transported between belts that twist 180 degrees along the run of the belts. In this way, the check is inverted from an upside-down orientation into a right-side-up orientation. At the same time, because the check is rotated by the twister, the check is also flipped from front to back.

The apparatus can also be used to process documents extracted from windowless envelopes. When documents are extracted form windowless envelopes, the order and orientation of the documents are unknown. As with windowed mail, the MICR module 135 can be used to determine the orientation of the checks and the order of the documents within a transaction. If the MICR module 135 detects certain magnetic fluctuations in the document after the document has been magnetized, then the MICR module tags the document as a check. Otherwise, the document is tagged as an invoice or as being an indeterminable document.

In addition, when processing windowless mail, a second orientation detector is included for determining the orientation of the invoices. For this purpose, the apparatus 10 includes a content imaging module 140 having a pair of line scan cameras 141a, 141b located along the document path downstream from the MICR module 135. The content imaging module 140 cooperates with the system controller 95 to detect the orientation of the invoices based on the image scanned by the cameras 141a, 141b. A pair of cameras is provided so that both sides of the invoice can be scanned. The cameras may also be used to scan both sides of each check.

When processing windowless mail, because the order of the documents within a transaction is not generally constant, it may be desirable to reorder documents within a transaction that are out of sequence, rather than directing the transaction to a reject bin. For this purpose, when processing windowless mail, it is desirable to include a reordering module 145 along the document path prior to the reverser 150. The reordering module 145 functions to reorder the sequence of two successive documents if the two documents are determined to be in the wrong sequence. For instance, if a corresponding check and invoice are being conveyed so that the check precedes the invoice, in a transaction in which the invoice should precede the check, the reordering module 145 switches the sequence of the check and invoice so that the invoice precedes the check along the path of movement.

If the order of the documents within a transaction is not determined, then the documents in the transaction are electronically tagged by the system controller 95 and sorted separately from ordered documents. Similarly, if the orientation of a document is not determined, then the document along with the other documents in the transaction are electronically tagged by the system controller 95 and sorted separately from ordered documents.

The apparatus may further include a document imager 230 for acquiring and exporting images of the orientated and ordered documents. The document imager 230 operates similarly to the envelope imager described above, and the details of such a document imager are described in copending U.S. patent application Ser. No. 08/687,704.

The document imager 230 acquires images of the documents. The images are then exported to a remote device and stored so that the images can be retrieved during subsequent processing, if desired. In addition, the document imager 230 may process the image data to determine various data for the documents. For instance, in a singles transaction, the check will have a MICR line and the invoice will ordinarily have an OCR line that contains information relating to the customer account and the invoice amount. The document imager may process the images to read the MICR line for the check and the OCR line for the invoice. The information extracted from the images is then combined with the image data to form a data record for each transaction. The imaged documents are then stacked in the stacker 300, which sorts the documents either by document-type or by transaction.

When a batch of mail is processed, the pieces are discharged to various locations. For instance, envelopes that are not qualified for extraction are outsorted to the outsort bin 40. Contents that are not properly extracted are reunited with their respective envelope and directed to the reunite bin 125. Contents that are properly extracted and processed are stacked in the stacker 300. It is desirable to monitor the pieces in the batch so that a record is kept of the final location of each piece after the batch is processed. Accordingly, the apparatus creates a log that includes information for each piece of mail in a batch and the status or location of each piece after processing. The log also identifies the contents extracted from an envelope with information about the envelope. Therefore, the envelope from which a document was extracted can be identified during subsequent processing, if desired.

For example, a log may be created for a batch of ATM deposit envelopes. The pieces may be processed by acquiring images of the envelopes, determining the identification number printed on the envelopes by the ATM, extracting the contents, reordering and reorienting the contents, imaging the contents, determining the MICR line for any checks in the contents and stacking the contents. The log for such a batch would be organized according to the sequence number for each piece, which is the sequential number that the apparatus assigns to each piece in a batch. For each envelope the log would include the following: the sequence number, the ATM identification number, if determined, an identification of the contents extracted from the envelope, including the MICR line, if determined, and the location of the envelope and/or contents after processing (i.e. outsort bin, reunite bin, or stacker).

According to the foregoing method, the envelopes are processed by acquiring image data of the envelopes, extracting the documents from the envelopes, correlating the envelope image data with the extracted documents and discarding the envelopes. According to an alternate method, the envelopes or a portion of the envelopes are not discarded. Instead, the envelope is processed along with the extracted documents.

In the alternate method, the envelopes are qualified by the thickness detector 22, metal detector 24 and the envelope imager 25 as described above in connection with the method described above. The envelopes that are qualified for extraction are then edge-severed at the cutting station. All four edges are severed in the alternate method. This can be accomplished in one of two ways. The trailing edge of the envelopes can be pre-cut by a separate device before the envelopes are placed into the input bin 16. The cutting station 30 then severs the three remaining edges of the envelopes. Alternatively, the cutting station can be modified so that the cutting station severs all four edges of the envelopes.

From the cutting station, the envelopes are conveyed to the extractor 50. The extractor 50 is configured similarly to the extractor 50 described above and illustrated in FIGS. 5A–5E. However, since all four edges of the envelopes are severed, the envelopes and accompanying documents are processed as follows.

In FIG. 5A, an envelope is shown as it first enters the extractor. The system transport 75 conveys the envelope and its contents past a rotatable extraction head 52. The suction cup entrains one face of the envelope, referred to as the leading face. As the envelope passes horizontally through the extractor, the extraction head rotates so that the leading face entrained by the suction cup is peeled away from the contents and diverted upwardly into the extraction transport, as shown in FIGS. 5B and 5C. At the same time, the contents of the envelope and the trailing face of the envelope are directed downwardly into the reversible transport 60, which conveys the contents and the trailing face away from the leading face. Once the leading face is separated from the contents and trailing face, the reversible transport reverses directions and conveys the contents and the trailing face upwardly into the extractor transport 56. The deflector 62 directs the leading face toward the path designated C in FIG. 5. After the leading envelope face enters the path designated C, the deflector pivots away from the extractor transport. The contents and trailing envelope face follow the main path of the extraction transport to the document path designated D in FIG. 5. In this way, the leading face is separated from the contents and the trailing face.

The transactional documents leaving the extractor 50 along path D include the documents from the envelope and the trailing face of the envelope. For instance for an ATM deposit envelope, the transaction includes a check, and the front face of the envelope. These two pieces are then singulated and processed together as a transaction. The device may also process envelopes having two or more documents. When processing such mail, the singulator is altered to process transactions having three or more pieces so that the front envelope face can be processed with the contents. The system controller 95 monitors the transactional boundaries so that the front face of an envelope is processed along with the contents from the envelope. In this way, the front face of an envelope is not processed together with the documents extracted from another envelope.

After the documents are manipulated by reordering, and reorienting as desired, the documents are stacked in the stacker 300 according to variable criteria. For instance, the documents may be manipulated into the proper order and orientation and then stacked so that the front face of an envelope is stacked along with the check and invoice extracted from the envelope. Alternatively, the checks, the invoices, and the envelope faces can be sorted to different bins.

In addition, preferably, a printer is located along the transport path 75 for printing identifying information on each piece in the transactions. For instance, on each piece in a transaction the printer prints the batch number and the piece number, which is the sequential number assigned to each piece in a batch. The printed information allows the batch to be reconstructed should the pieces become mixed up out of order by mistake after processing. The identifying information also correlates the documents within a transaction so that if the pieces of a transaction are separated, they can later be identified as being in the same transaction. For instance, documents may be processed so that the envelope faces with markings are sorted separately from the checks and invoices. During remittance processing the operator may determine that a payment was late. The envelope face with the postmark date stamp for the payment can be located and identified from the information printed on the envelope face by the printer. The operator can then verify whether the payment was late by examining the postmark date stamp on the envelope.

In light of the foregoing, several of the advantages of the foregoing apparatus are apparent. The apparatus processes mail by automatically extracting contents from envelopes and reordering and reorienting the contents as necessary. During processing the contents are correlated with the envelope from which the contents were extracted so that the envelope can be identified during subsequent processing. The contents and envelope may be correlated in one of several ways. The envelope may be scanned to obtain an image, and the image data may be stored so that the image can be retrieved. A face of the envelope may be severed and processed together with the contents to correlate the envelope with the contents. In addition, a log may be created that identifies each envelope and the contents extracted therefrom to correlate the contents and the envelope.

Accordingly, it will be recognized by those skilled in the art that changes or modifications may be made without departing from the broad inventive concepts of the invention. Therefore, it should therefore be understood that this invention is not limited to the particular embodiments described herein, but is intended to include all changes and modifications that are within the scope and spirit of the invention as set forth in the claims.

That which is claimed is:

1. An apparatus for processing envelopes containing documents, comprising:
   an envelope imaging device for acquiring images of the envelopes;
   an extractor for receiving the envelopes from the envelope imaging device and extracting the documents from the envelopes;
   a document imaging device for acquiring images of the extracted documents; and
   a system controller operable to assign extracted documents to a transaction and associate an envelope image with the transaction.

2. The apparatus of claim 1 comprising a sorter for sorting extracted documents according to select criteria.

3. The apparatus of claim 1 comprising a document transport for serially feeding the documents from the extractor to the document imaging device.

4. The apparatus of claim 1 wherein the envelope imaging device scans each envelope to determine light levels at discrete points along a plurality of lines to acquire a set of image data for each envelope.

5. The apparatus of claim 1 comprising a non-volatile storage medium for storing the images of the envelopes and the documents.

6. An apparatus for processing envelopes containing contents, comprising:
   an envelope imaging device for acquiring image data for the envelopes;
   a contents imaging device for acquiring image data for the contents of the envelopes; and
   a system controller operable to correlate the image data for the contents with the image data for the envelope in which the contents were contained.

7. The apparatus of claim 6 comprising an extractor operable to extract the contents from the envelopes.

8. The apparatus of claim 7 comprising a transport for conveying the envelopes from the image acquisition device to the extractor.

9. The apparatus of claim 6 comprising an input bin for receiving a stack of envelopes and a feeder for serially feeding the envelopes from the input bin.

10. The apparatus of claim 6 wherein the envelope image acquisition device is a high-speed line scan camera.

11. The apparatus of claim 6 wherein the system controller is operable to create a data record for an envelope, comprising the image data for the envelope and the image data for the contents contained within the envelope.

12. The apparatus of claim 6 comprising an orientation detector responsive to the contents image acquisition device to determine whether the contents are in a first predefined orientation or some other orientation.

13. The apparatus of claim 12 comprising a document orienter responsive to the orientation detector to selectively reorient the contents into the first predefined orientation.

14. The apparatus of claim 6 comprising a sorter for sorting extracted contents according to select criteria.

15. The apparatus of claim 6 comprising a transport for serially feeding the contents from the extractor to the contents imaging device.

16. The apparatus of claim 6 wherein the envelope imaging device scans each envelope to determine light levels at discrete points along a plurality of lines to acquire a set of image data for each envelope.

17. An apparatus for processing envelopes containing documents, comprising:
   means for obtaining an optical image of an envelope containing a document;
   means for obtaining an image of the document; and
   means for correlating the envelope image with the document image.

18. The apparatus of claim 17 comprising means for extracting the document from the envelope.

19. The apparatus of claim 17 comprising means for processing the document image to alter the image acquired by the means for obtaining an image of the document.

20. The apparatus of claim 17 comprising means for sorting the document according to a select criteria.

21. The apparatus of claim 17 comprising means for determining the orientation of the document.

22. The apparatus of claim 17 comprising means for selectively reorienting the document into a predefined orientation.

23. The apparatus of claim 17 wherein the document image includes a string of characters and the apparatus comprises means for analyzing the document image to read the string of characters.

24. A method for processing a batch of envelopes containing documents, comprising the steps of:
   scanning the envelopes to acquire image data corresponding to the image of at least a portion of each envelope containing a document;
   extracting the documents from the envelopes;
   scanning the extracted documents to acquire image data corresponding to the image of at least a portion of the extracted documents; and
   creating a data record comprising the image data for one of the envelopes and the image data for the documents extracted from the envelope.

25. The method of claim 24 comprising the step of storing the data record on a non-volatile storage medium.

26. The method of claim 24 comprising the step of qualifying envelopes for extraction and sorting envelopes that do not qualify for extraction to an outsort area.

27. The method of claim 26 comprising the step of reuniting selected extracted documents and the envelopes from which the documents were extracted and sorting the reunited documents and envelopes to a reunite area.

28. The method of claim 27 comprising the step of sorting selected documents in a stacker area according to predetermined sort criteria for the documents.

29. The method of claim 28 comprising the step of creating a log identifying the area to which each envelope and its associated contents were sorted during processing.

30. The method of claim 29 wherein the log comprises information about the documents extracted from the envelopes.

31. The method of claim 24 comprising the step of creating a log that identifies each envelope in the batch and each document extracted from a particular envelop.

32. The method of claim 31 wherein the log includes information regarding each document extracted from a particular envelop.

33. The method of claim 24 comprising the step of analyzing the image data for an envelope or a document extracted from the envelope to read a string of characters on the envelope or document.

* * * * *